United States Patent
Schweger

(10) Patent No.: US 10,462,329 B2
(45) Date of Patent: Oct. 29, 2019

(54) METHOD FOR SUBSTRATE SHRINKAGE COMPENSATION

(71) Applicant: HEIDELBERGER DRUCKMASCHINEN AG, Heidelberg (DE)

(72) Inventor: Thies Schweger, Husum (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 16/157,160

(22) Filed: Oct. 11, 2018

(65) Prior Publication Data

US 2019/0149692 A1    May 16, 2019

(30) Foreign Application Priority Data

Nov. 15, 2017    (DE) .................. 10 2017 220 322

(51) Int. Cl.
   H04N 1/387    (2006.01)
   B41J 2/045    (2006.01)
   H04N 1/40     (2006.01)

(52) U.S. Cl.
   CPC .......... *H04N 1/387* (2013.01); *B41J 2/04586* (2013.01); *H04N 1/40068* (2013.01)

(58) Field of Classification Search
   CPC ................................ H04N 1/40; H04N 1/387
   See application file for complete search history.

(56) References Cited

U.S. PATENT DOCUMENTS

| 5,093,674 A * | 3/1992 | Storlie | G03G 15/0121 347/116 |
| 8,733,879 B2 * | 5/2014 | Numata | B41J 29/377 347/101 |
| 2003/0175505 A1 * | 9/2003 | Bean | B42D 15/0093 428/343 |
| 2014/0063513 A1 | 3/2014 | Enge et al. | |

(Continued)

FOREIGN PATENT DOCUMENTS

| DE | 102013214014 A1 | 1/2015 |
| DE | 102014013370 A1 | 3/2016 |

*Primary Examiner* — King Y Poon
*Assistant Examiner* — Michael Burleson
(74) *Attorney, Agent, or Firm* — Laurence A. Greenberg; Werner H. Stemer; Ralph E. Locher

(57) ABSTRACT

A method for compensating substrate shrinkage during printing on a printing machine includes generating multiple image parts of a digitally available image to be produced, factoring in information on substrate shrinkage by subdividing the image using a computer, subdividing generated image parts into data blocks using the computer, saving actual positions of blocks in the digital image using the computer, calculating target positions of all blocks in the digital image using the computer by shifting the blocks away from one another by one pixel creating single-pixel-wide gaps between blocks in the digital image, copying and rearranging blocks in the digital image according to calculated target positions using the computer, calculating positions of single-pixel-wide gaps using the computer, filling gaps with digital image data of neighboring pixels using the computer to create a compensated digital image. The compensated digital image is printed on the printing machine.

10 Claims, 4 Drawing Sheets

(56) References Cited

U.S. PATENT DOCUMENTS

2014/0211057 A1* 7/2014 Chien .................... H04N 5/361
                                                                  348/308
2015/0110507 A1* 4/2015 Sudo .................... G03G 15/041
                                                                  399/40

* cited by examiner

METHOD FOR SUBSTRATE SHRINKAGE COMPENSATION

CROSS-REFERENCE TO RELATED APPLICATION

This application claims the priority, under 35 U.S.C. § 119, of German Patent Application DE 10 2017 220 322.6, filed Nov. 15, 2017; the prior application is herewith incorporated by reference in its entirety.

BACKGROUND OF THE INVENTION

Field of the Invention

The invention relates to a method for substrate shrinkage compensation during a printing operation.

The technical field of the invention is the field of digital printing.

In the course of a printing operation, the printing substrate used in the process is subject to deformation in various ways. For instance, it is known that the introduction of fluids into the printing substrate by the application of ink causes the printing substrate to widen, resulting in a distorted printed image. That distortion of the printed image is at least partly reduced once the ink has dried but needs to be factored in a suitable way when multiple color separations are applied on top of one another because register errors may be the result since the individual color separations are printed on top of one another.

Ink jet printing, however, suffers from a further problem. Since the ink that is used in ink jet printing has a high water content, the water that is introduced needs to be removed as quickly as possible from the printing substrate by drying the ink to be able to subject the printed printing substrate to further treatment. That drying of the ink is achieved by heating the printing substrate in a dedicated drying component of the ink jet printing machine. Since that needs to be done very quickly, the process consumes large amounts of energy or heat. However, that causes not only the ink to lose moisture, but the entire printing substrate. This loss of moisture in the printing substrate causes the printing substrate to shrink in a non-linear way, typically giving the substrate a trapezoid or convex shape. That type of shrinkage is caused by the way the paper is transported during the drying period and is thus impossible to avoid. The necessity of transporting the sheet introduces additional forces into the printing substrate. Those forces additionally contribute to that shrinkage-related distortion.

In order for the printed image that is created on the printing substrate to have the correct geometric dimensions after the printing and drying processes, the image data to be applied need to be pre-distorted, namely enlarged, in a corresponding way. Depending on the printing substrate that is used, that pre-distortion typically corresponds to 0.5% to a maximum of 1% of the width and height of the printing substrate. Assuming a 0.5% distortion, for a typical sheet width of 1,050 mm and a typical sheet length of 750 mm, that amounts to about 5 mm in the direction of the width and 4 mm in the direction of the height. In terms of pixels, that translates into 200 to 250 pixels in every direction for a print resolution of 1,200 dpi. Two major approaches are known in the art to attain the required pre-distortion:
1. The image data are scaled in the rendering process. However, that only provides linear scaling.
2. Manual or automated fan-out control has become known from lithographic offset printing as a way of compensating for the expansion of the paper described above. That method is based on image data that have already been screened, which requires either a manipulation of the screened data or a re-screening of the manipulated data. If the screened data are manipulated, the screen itself is compromised, resulting in a mottled print.

Automated fan-out control is known, for instance, from German Patent Application DE 10 2014 013 370 A1, which discloses a method for a model-based compensation for local register inaccuracies in a printing press. A model for calculating geometric deviations is created to calculate the aforementioned paper expansion caused by the introduction of moisture into the printing substrate. Based on that model, the individual color separations are modified in a corresponding way to counteract the expansion of the paper. As mentioned above, a disadvantage of that method is that it is based on data that have already been screened and thus requires a correspondingly high computational effort and computing time on the computer that makes the calculations and additionally has a negative effect on the screened image.

SUMMARY OF THE INVENTION

It is accordingly an object of the invention to provide a method for compensating for substrate shrinkage, which overcomes the hereinafore-mentioned disadvantages of the heretofore-known methods of this general type in a quick and efficient way during a printing operation to guarantee the quality of a print in a printing operation.

With the foregoing and other objects in view there is provided, in accordance with the invention, a method for compensating for substrate shrinkage during a printing operation on a printing machine by using a computer, the method comprising the steps of generating multiple image parts of a digitally available image to be produced factoring in information on substrate shrinkage by a subdivision by the computer, subdividing the respectively generated multiple image parts into a number of data blocks by using the computer, saving actual positions of all data blocks in the digital image by using the computer, calculating target positions of all data blocks in the digital image by using the computer by shifting the data blocks away from one another by one pixel to create single-pixel-wide gaps between the data blocks in the digital image, copying and rearranging the data blocks in the digital image in accordance with the calculated target positions by using the computer, calculating positions of the resultant single-pixel-wide gaps by using the computer, filling the single-pixel-wide gaps with digital image data of neighboring pixels by using the computer, and printing the compensated digital image on the printing machine.

The present method is based on the principle of counteracting the expected shrinkage of the resultant printed image due to the shrinkage of the printing substrate by pre-distorting the image to be printed. This pre-distortion of the yet unprinted digital image ultimately means that the image data need to be manipulated. This is done by adding image data in printing substrate regions where a corresponding shrinkage occurs to attain the widening that is accordingly required. For this purpose, it is necessary for information on the shrinkage to be expected for the printing substrate to be used and the ink to be used. This information is then used to manipulate a digitally available image to be produced in a corresponding way. This means that the digitally available image already contains the shrinkage information that is to be expected in the course of the printing operation. Then the actual method of the invention starts. The digitally available image is subdivided into multiple horizontal image parts. In every resultant image part, an average distance to the actual print size without the shrinkage is determined. Based on the width of the present gap per image part, the computer subdivides the respective image parts into individual data blocks in the print preparation phase. Then the positions of the individual data blocks in the digitally available image are saved. Then the computer pulls the individual data blocks away from one another in such a way that one pixel remains free between the individual data blocks. Since the number of image parts and blocks is calculated as a function of the maximum gap generated by the shrinkage, this pulling apart of the individual data blocks leads to a complete compensation for the shrinkage of the image. Thus, by using the data block target positions that have been calculated in this way, a new digital image is created in which the shrinkage has been completely compensated for by the shifting of the data blocks and the resultant single-pixel-wide gaps. Since there now are gaps between the individual data blocks in the image, these gaps are filled with digital image data of the respective neighboring pixels. Since the width of the gaps is only one pixel, this is virtually invisible to the human eye in the resultant print and thus does not cause any visible artifacts in the final print. The digital image that has been compensated in this way may then be printed in a corresponding way on the printing machine. As a result of the substrate shrinkage that occurs during the drying process, the pre-distorted image that initially was in digital form and has now been printed has been transformed into a finished print that precisely corresponds to the expected geometric dimensions.

Advantageous and thus preferred further developments of the method will become apparent from the associated dependent claims and from the description together with the associated drawings.

Another preferred development of the method of the invention in this context is that the computer factors in the substrate shrinkage in the digitally available image to be produced in such a way that the size of the digital image is already adapted to the shrinkage to be expected during the printing operation. In order for the method of the invention to work as expected, the digitally available image to be produced already needs to be adapted to the substrate shrinkage that is to be expected. Therefore, substrate shrinkage information for the respective substrate that is used needs to be available at the beginning of the method of the invention for the digitally available image that is to be produced to be adaptable in preparation of the method of the invention. This information may be retrieved from a database that contains shrinkage information on the existing printing conditions such as the ink and substrate. If the required information items are not yet available for the intended printing operation, they need to be established by test prints. They may then be added to the database for subsequent printing operations under similar printing conditions.

A further preferred development of the method of the invention in this context is that the computer subdivides the digital image into image parts of stripe-shaped image sections oriented either along or transverse to the printing direction, with the number of the image parts resulting from the number of pixels of the largest pixel gap caused by the shrinkage of the substrate at the beginning of the digital image minus the number of pixels of the smallest pixel gap caused by the shrinkage of the substrate at the end of the digital image. The number of image parts which the digitally available image is subdivided into is a function of the number of pixels of the largest pixel gap that results from the shrinkage of the substrate and is already present in the digital image because it has already been adapted to the shrinkage of the substrate. The larger the largest pixel gap caused by the shrinkage of the substrate, the more image parts are required, because the shrinkage differential between the individual image parts must not be more than one pixel. In this context, the image parts correspond to stripe-shaped image sections that may be referred to as having a rectangular shape.

An added preferred development of the method of the invention in this context is that the computer subdivides the image parts of the digital image into quadrangular data blocks having a number which results from the number of pixels that are missing due to the shrinkage of the substrate in the respective image part to be subdivided. The individual stripe-shaped image parts are then subdivided into individual quadrangular data blocks. In this context, the shape of the quadrangle is irrelevant. Theoretically, other geometric shapes may be used as long as it is ensured that the individual data blocks may be pulled apart in such a way that a single-pixel-wide data gap is created. Larger gaps of more than one pixel are to be avoided for reasons of the resultant image quality. In this context, the number of data blocks is a function of the number of pixels that is missing due to the shrinkage of the subject in the respective stripe-shaped image section. The more pixels that are missing in an individual stripe-shaped image section due to the shrinkage of the substrate, the more data blocks need to be created in the stripe-shaped image part to compensate for the pixel gap resulting from the shrinkage of the substrate by pulling the blocks apart to create a single-pixel-wide gap.

An additional preferred development of the method of the invention in this context is that the height and width of the generated data blocks plus the X-coordinates and the Y-coordinates of their actual positions as well as the calculated target positions of the generated data blocks and the positions of the resultant single-pixel-wide gaps are saved in a digital look-up table by the computer. The computer then saves the exact position of the generated data blocks, i.e. the height and width and the X-coordinates and the Y-coordinates of the data blocks of the digital image in a digital look-up table to be available for the further processing of the individual data blocks in a way that is as efficient as possible. The same applies to the target positions of the individual data blocks after the shifting step as well as to the single-pixel-wide gaps generated in the shifting step.

Another preferred development of the method of the invention in this context is that the filling of the single-pixel-wide gaps between the generated data blocks by digital image data of neighboring pixels by using the computer is done by interpolation of the digital image data of at least one of the two respective neighboring pixels, using the respective lower value, the respective higher value, the average value, or the median value of the neighboring pixels for the interpolation. The single-pixel-wide gaps that have been created between the generated data blocks in the shifting step need to be filled to avoid image artifacts. In order to do this in a way which is as invisible to the human eye as possible, it is expedient to fill the data gaps by interpolation. In this process, the image data of the respective neighboring pixels at the position of the pixel of the individual pixel gap are used for the interpolation. Since the width of the pixel gap is only a single pixel, it is thus expedient to use the image data of the pixels immediately to the left and right of the pixel in question. For this purpose, the respective lower value of the two neighboring data pixels or the respective higher value, an average or a median value may be used for the interpolation. It is also conceivable to use more than just the immediately neighboring pixel to the left or right and then to carry out the interpolation process in the way described above.

A further preferred development of the method of the invention in this context is that the computer factors in the shrinkage of the substrate in the digitally available image to be produced in the x-direction and in the y-direction of the digital image and that the process of compensating for the shrinkage of the substrate is carried out in two successive runs, one for the shrinkage of the substrate in the x-direction and one for the shrinkage of the substrate in the y-direction. In order to achieve the maximum possible degree of compensation for the shrinkage of the substrate, it is expedient for the method described above to be carried out in two directions. In a first run of the method, the image parts may be generated in the x-direction of the digitally available image and the individual data blocks may be obtained based thereon, whereas in a second run, the same method of generating the image parts and digital data blocks is carried out in the y-direction. In this context, x-direction and y-direction correspond to the two axes of a coordinate system applied to the digital image. In the second run of the method, it is possible to use the digital image that has already been compensated as a result of the first run. Alternatively, both runs may be carried out in parallel and independently of one another. In this case, both passes are carried out by using the same digital image containing shrinkage information and the two resultant images are combined to form a common total image to be printed. The approach to be used depends on the respective conditions and parameters of the printing operation to be carried out.

An added preferred development of the method of the invention in this context is that the computer subdivides the digitally available image to be produced into at least four quadrants and that the method for compensating for the shrinkage of the substrate is carried out successively for the respective individual quadrants. In order to make the method of the invention even more accurate and efficient, the digitally available image may be subdivided into four quadrants. Then the method of the invention is successively applied to every one of the individual quadrants and the quadrants that have been compensated in this way are recombined to form a digital compensation image. Then the data is forwarded to the printing machine for completing the print job. In this case, too, the size and exact position of the individual quadrants depends on the printing conditions of the printing operation that requires compensation and on the printing substrate to be used and the image to be produced.

An additional preferred development of the method of the invention in this context is that the digitally available image to be produced is formed of halftone data and is screened by the computer after the shrinkage compensation process in accordance with the method of the invention and before the printing operation. The digital image that has been compensated in accordance with the invention may then be forwarded to the raster image processor within the print preparation phase in the course of the work flow. The raster image processor screens the image and subsequently forwards it to the printing machine for the actual printing operation. Advantages of carrying out the method of the invention before the screening process include the facts that no re-screening is required and that there are no negative effects on the halftone image because of a subsequent compensation process.

A concomitant preferred development of the method of the invention in this context is that the substrate shrinking compensation in accordance with the invention is adapted to the ink jet printing operation and that the compensated digital image is printed on an ink jet printing machine. The substrate shrinking effect described above, which is due to the drying process, is first and foremost a problem of ink jet printing processes, which means that the method of the invention for compensating for occurring substrate shrinkage is above all applied to ink jet printing machines. An application of the method of the invention to other printing operations such as lithographic offset printing, although theoretically conceivable, is usually not required because in lithographic offset printing, there is much less substrate shrinkage due to the fact that the ink has a much lower water content. However, if for any reason similar substrate shrinkage occurs in a lithographic offset printing press, the method may just as well be used in a lithographic offset printing press.

Other features which are considered as characteristic for the invention are set forth in the appended claims.

Although the invention is illustrated and described herein as embodied in a method for substrate shrinkage compensation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
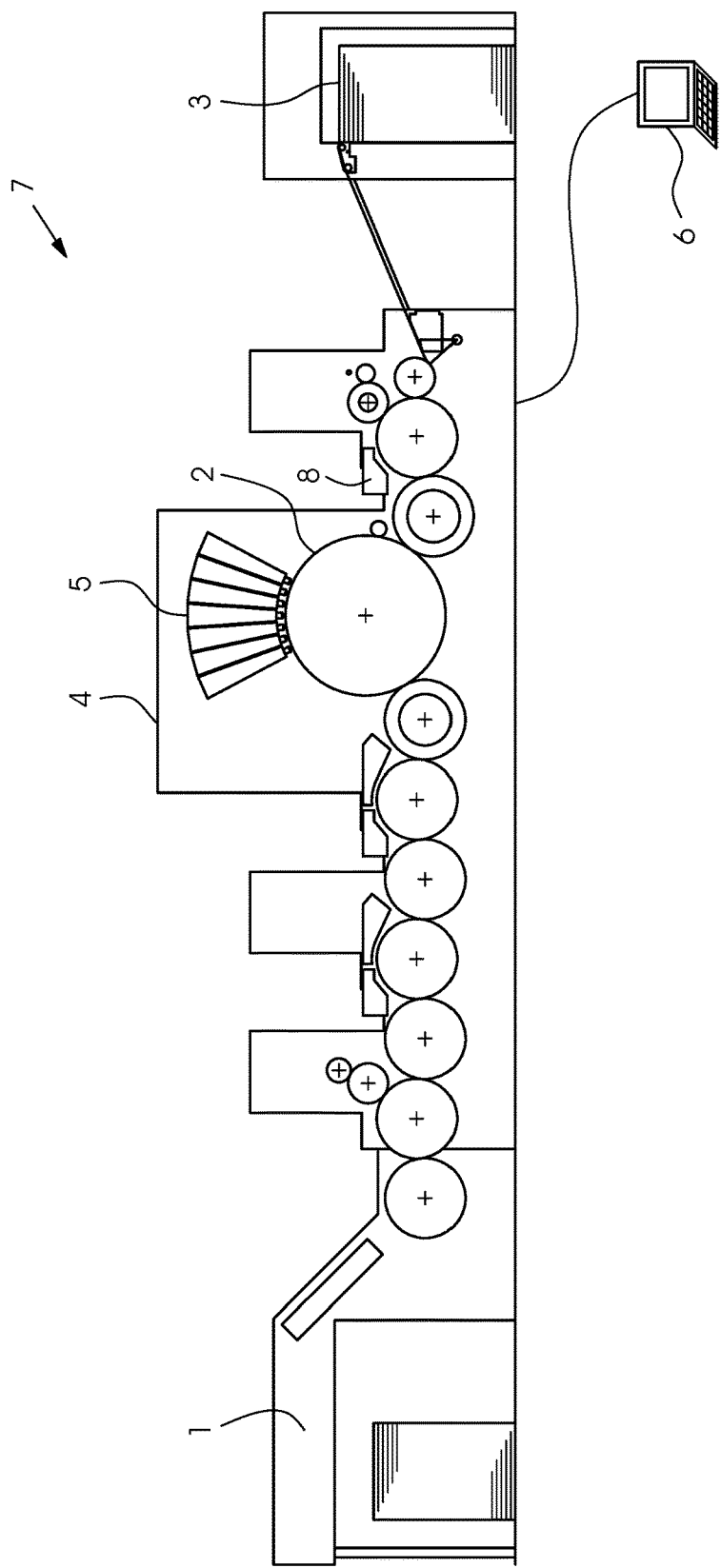
FIG. 1 is a longitudinal-sectional view of a sheet-fed ink jet printing machine for applying the method of the invention.

Referring now to the figures of the drawings in detail and first, particularly, to FIG. 1 thereof, it is seen that the field of application of the preferred exemplary embodiment is an inkjet printing machine 7. An example of a fundamental construction of such a machine 7 shown in FIG. 1 includes a feeder 1 for feeding a printing substrate 2 to a printing unit 4 where it receives an image printed by print heads 5, a drier 8 for drying the printing substrate 2 and a delivery 3. The machine is a sheet-fed ink jet printing machine 7 controlled by a control unit 6.

Figure 2:
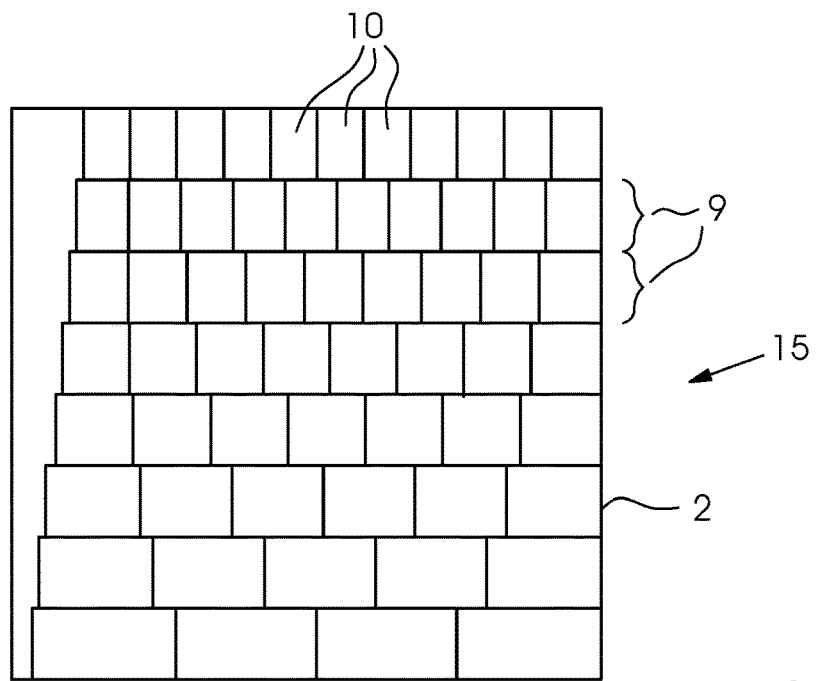
FIG. 2 illustrates a digitally available image which includes substrate shrinkage information and is subdivided into image parts and blocks.
Figure 5:
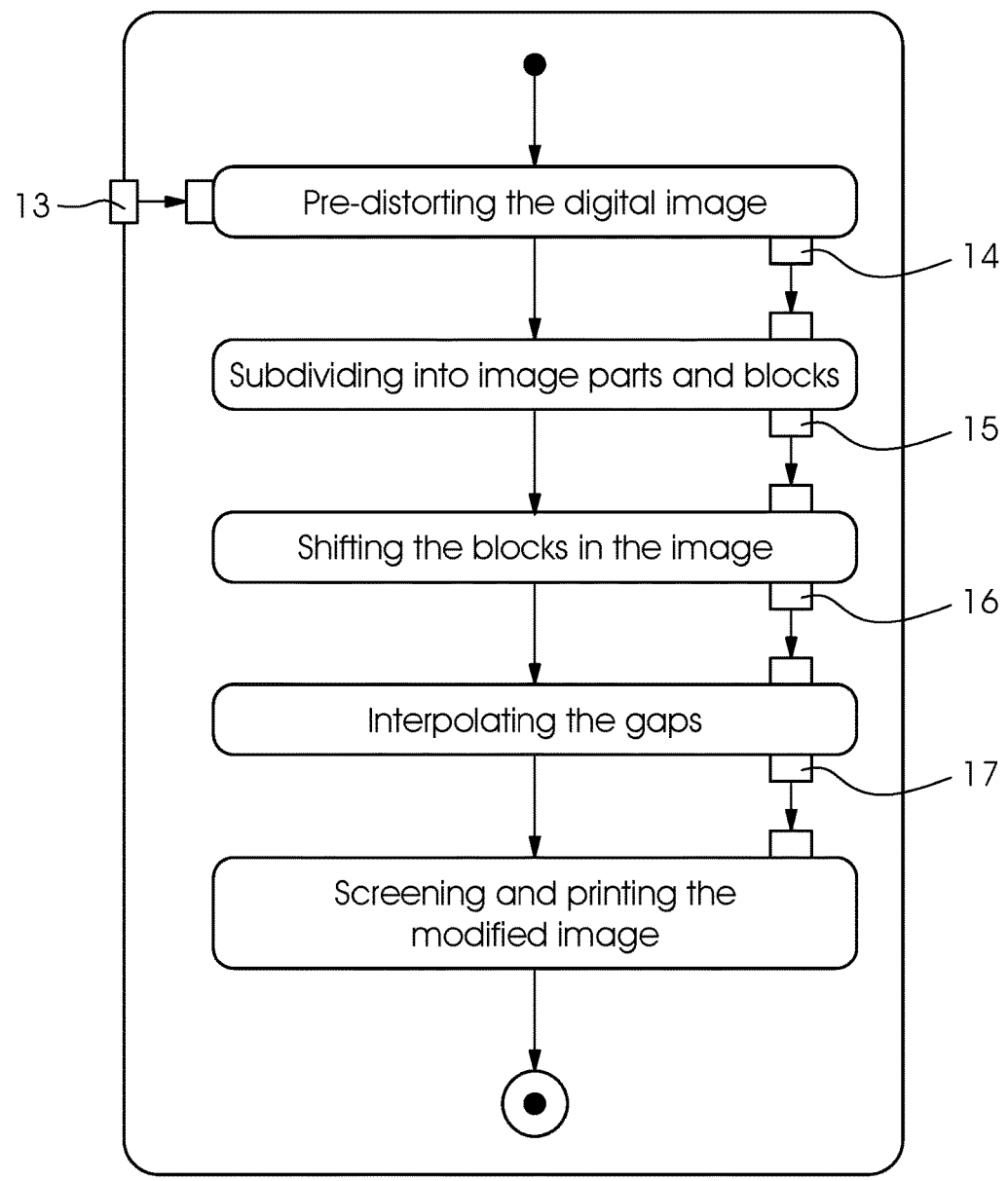
FIG. 5 is a schematic flow chart of the method of the invention.

In a preferred embodiment of the method of the invention in accordance with FIG. 5, a digital image 13 is converted from a shrunk condition 14 to a compensated target condition 17. The entire process is computer-controlled, for instance by the control unit 6 of the sheet-fed ink jet printing machine 7 or, in a preferred embodiment, by a computer of a print preparation department. FIG. 2 illustrates an example of a starting condition. A black frame indicates the target condition, which refers to a digital image 13 of 200*200 pixels in size. Inside the frame, the actual condition after the printing operation and the drying process is shown. In order to be able to implement counter-distortion in accordance with the invention, this actual condition is generated by digitally pre-distorting the digital image 13 to create a pre-distorted digital image 14. In the example shown in FIG. 3, the latter is three pixels too small at the bottom on the left, resulting in an actual condition of 197 pixels, and ten pixels too small at the top on the left, resulting in an actual condition of 190 pixels. The pre-distorted digital image 14 is subdivided into 10−3+1=8 image parts to create only respective jumps of one pixel per image gap 11 from an image part 9 to an image part 9 after compensation in accordance with the invention has been made in the image. This corresponds to the general formula of large deviation minus small deviation plus one.

The next step is to calculate the required number of data blocks 10 per image part 9. In an image part 9 at the very bottom, which has three missing pixels in the illustrated example, four data blocks 10 are needed. The general formula for calculating the number of data blocks 10 thus is missing pixels in the image part 9 plus one. For their part, the blocks 10 have a height of 200 pixels divided by 8 equaling 25 pixels. In accordance with the aforementioned formula, the width of the data blocks 10 is selected in such a way that the 197 pixels present in the actual condition of the image part 9 in question are equally distributed to the four blocks, which in the present case corresponds to 3*49 pixels and 1*50 pixels. This is repeated for all eight image parts 9, resulting in a subdivided digital image 15 that has the following data:

Image part 1: 4 blocks that are 25 pixels high, 3 of which are 49 pixels wide and 1 of which is 50 pixels wide (total of 197 pixels).

Image part 2: 5 blocks that are 25 pixels high, 4 of which are 39 pixels wide and 1 of which is 40 pixels wide (total of 196 pixels).

Image part 3: 6 blocks that are 25 pixels high, 3 of which are 32 pixels wide and 3 of which are 33 pixels wide (total of 195 pixels).

Image part 4: 7 blocks that are 25 pixels high, 2 of which are 27 pixels wide and 5 of which are 28 pixels wide (total of 194 pixels).

Image part 5: 8 blocks that are 25 pixels high, 7 of which 7 are 24 pixels wide and 1 of which is 25 pixels wide (total of 193 pixels).

Image part 6: 9 blocks that are 25 pixels high, 6 which are 21 pixels wide and 3 of which are 22 pixels wide (total of 192 pixels).

Image part 7: 10 blocks that are 25 pixels high, 9 of which are 19 pixels wide and 1 of which is 20 pixels wide (total of 191 pixels).

Image part 8: 11 blocks that are 25 pixels high, 8 of which are 17 pixels wide and 3 of which are 18 pixels wide (total of 190 pixels).

This condition of the subdivided digital image 15 is shown in FIG. 2. The black frame around the image indicates the target size of 200*200 pixels; the rectangles indicate the actual positions of the calculated data blocks 10. The data that have been calculated so far, i.e. the height and width of the data blocks 10 plus the x-coordinates and y-coordinates of their actual positions are saved in a LUT (look-up table).

Figure 3:
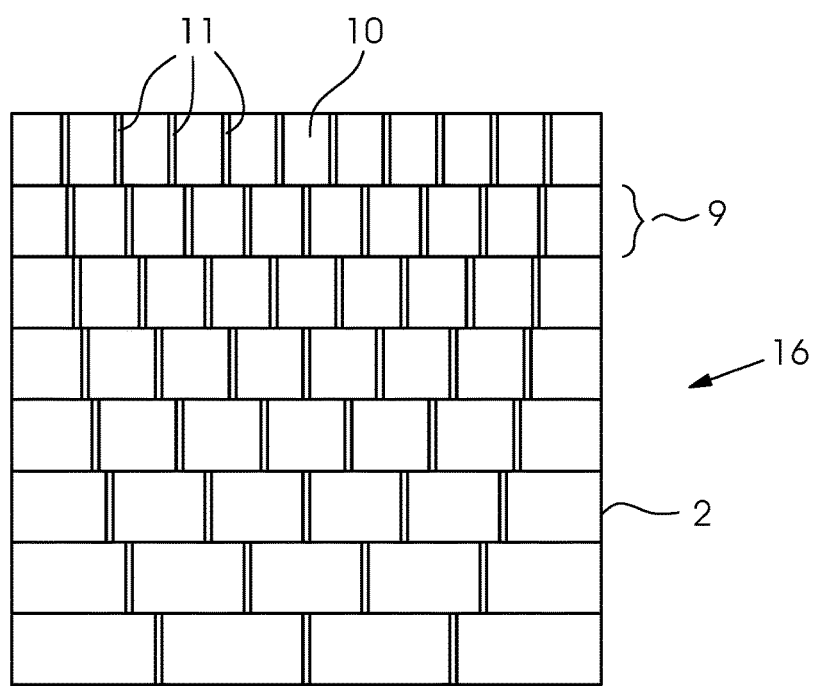
FIG. 3 illustrates a digital image with shifted data blocks for substrate shrinkage compensation.

In a following step, the target positions of the data blocks 10 are calculated. For this purpose, each data block 10 is shifted in the x-direction far enough to create a space of one pixel between the blocks 10. The direction of the shift is the direction in which the missing pixels are visible as a gap 11. The result is shown in FIG. 3 in the form of a shifted digital image 16. The target positions of the data blocks 10 in the x and y-directions are likewise saved in the LUT. In addition to the target positions of the data blocks 10, the positions and sizes of the gap regions, i.e. of the single-pixel-wide gaps that have been created between the data blocks 10, are determined and likewise saved in the LUT. The gap regions are visible in the form of the image gaps 11 in the figure in addition to the bold black frame indicating the target image and the actual positions of the data blocks 10.

Figure 4:
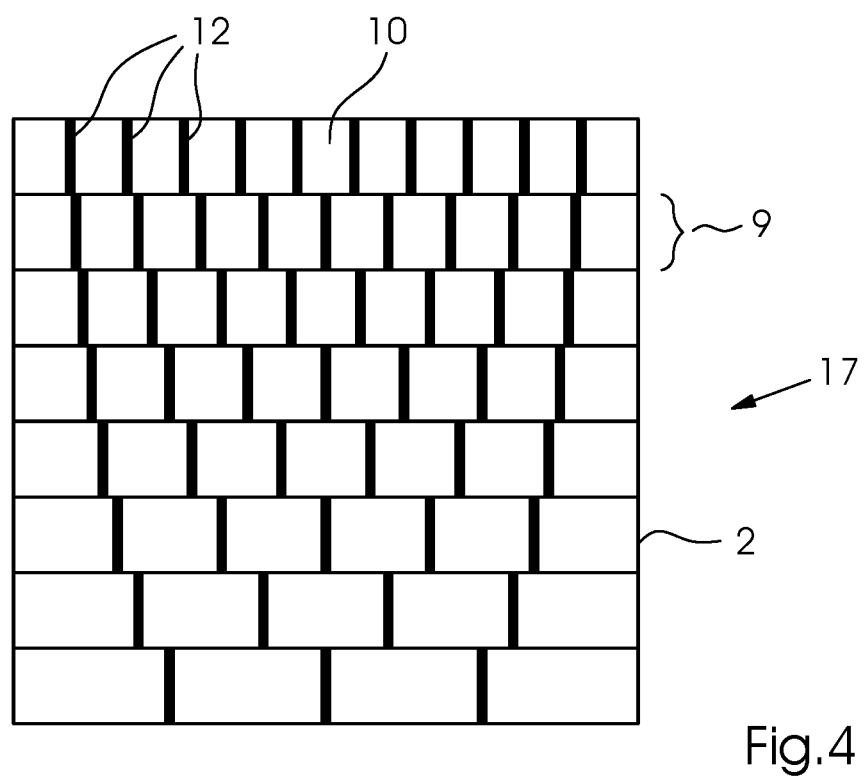
FIG. 4 illustrates a digital image with full compensation.

In the final step, the computer 6 uses the information in the LUT to carry out the actual adaptation of the available digital image 13. For this purpose, memmove (a C/C++ data transfer command) or memcpy (a C/C++ data copy command) are used to shift or copy the data blocks 10 from the actual position to the target position. Furthermore, to create the missing pixels, the respective neighboring pixels of the pixel to be interpolated in the single-pixel gap are inspected and the respective lower color value of the two pixels is used to fill the gap. FIG. 4 illustrates the condition of the interpolated digital image 17 of the present example in which the gap regions that have been filled by interpolation are clearly visible as interpolated image gaps 12.

What needs to be considered is the fact that the example shown in FIGS. 2 to 4 represents an intermediate step in the calculation of the finished digital image including substrate shrinkage information that is to be used for printing. Thus, it corresponds to the desired final condition of the actually printed and dried printed image. The compensated, i.e. pre-distorted, digital image 17 that is forwarded to the sheet-fed ink jet printing machine 7 does not correspond to this desired final printed condition, but to an image that has been counter-distorted in a trapezoidal or convex shape.

The illustrated exemplary embodiment indicates how the method is applied to the x-direction. In a further preferred embodiment, both directions are inspected, i.e. the x-direction and the y-direction. This is done in two successive runs. For the special case in which one direction is distorted in a non-linear way and the other direction is distorted in a linear way, the calculation is made in a single run. Moreover, the example focuses on only one quadrant or corner of a sheet of paper. In a further preferred embodiment, the four quadrants or corners of a sheet 2 of paper are inspected in parallel and the calculations are made in parallel. In this case, the calculation is made in parallel, starting from the center of the sheet 2 and moving towards the four corners.

The advantages of the method of the invention over the known methods include its speed and the fact that it is applied to halftone data. The high speed is necessary for modern sheet-fed ink jet printing machines 7, having a performance which reaches 2500 sheets 2 per hour. Thus, for fully variable printing, 2500 different sets of data have to be calculated per hour. An advantage of the halftone data is that the data are not screened until after the data distortion, avoiding a time-consuming re-calculation of the halftone. In addition, there are no negative effects on a halftone that has already been created.

The following is a summary list of reference numerals and the corresponding structure used in the above description of the invention:

1 feeder
2 printing substrate/sheet
3 delivery
4 ink jet printing unit
5 ink jet print head
6 computer
7 ink jet printing machine
8 drier
9 image parts
10 image/data blocks
11 image/pixel gaps
12 interpolated image gaps
13 digital image
14 pre-distorted digital image
15 subdivided digital image
16 shifted digital image
17 interpolated digital image

The invention claimed is:

1. A method for compensating for substrate shrinkage during a printing operation on a printing machine by using a computer, the method comprising the following steps:
generating multiple image parts of a digitally available image to be produced, factoring in information on substrate shrinkage, by subdividing the image by using the computer;
subdividing the respective multiple image parts that have been created into a number of data blocks by using the computer;
saving actual positions of all of the data blocks in the digital image by using the computer;
calculating target positions of all of the data blocks in the digital image by using the computer by shifting the data blocks away from one another by a respective pixel to create single-pixel-wide gaps between the data blocks in the digital image;
copying and rearranging the data blocks in the digital image in accordance with the calculated target positions by using the computer;
calculating positions of resultant single-pixel-wide gaps by using the computer;
filling the single-pixel-wide gaps with digital image data of neighboring pixels by using the computer to create a compensated digital image; and
printing the compensated digital image on the printing machine.

2. The method according to claim 1, which further comprises using the computer to factor in the shrinkage of the substrate in the digitally available image to be produced in such a way that a size of the digital image is already adapted to a shrinkage of the substrate to be expected during the printing operation.

3. The method according to claim 1, which further comprises using the computer to subdivide the digital image into image parts of stripe-shaped image sections being aligned either along or transverse to the printing direction, and providing a number of image parts resulting from a number of pixels of a largest pixel gap caused by the shrinkage of the substrate at a beginning of the digital image minus a number of pixels of a smallest pixel gap caused by the shrinkage of the substrate at an end of the digital image.

4. The method according to claim 3, which further comprises using the computer to subdivide the image parts of the digital image into quadrangular data blocks, and providing a number of the data blocks resulting from a number of pixels being missing due to the shrinkage of the substrate in the respective image part to be subdivided.

5. The method according to claim 1, which further comprises using the computer to save a height and a width of the generated data blocks plus x-coordinates and y-coordinates of their actual positions as well as the calculated target positions of the generated data blocks and the positions of the resultant single-pixel-wide gaps in a digital look-up table.

6. The method according to claim 1, which further comprises using the computer to fill the single-pixel-wide gaps between the generated data blocks with digital image data of neighboring pixels by interpolating the digital image data of at least one of two respective neighboring pixels, using one of a respective lower value, a respective higher value, an average, or a median value of adjacent pixels in the interpolation.

7. The method according to claim 1, which further comprises using the computer to factor in the shrinkage of the substrate in the digitally available image to be produced in an x-direction and in a y-direction of the digital image, and carrying out a process of compensating for the shrinkage of the substrate in two successive runs, one for the shrinkage of the substrate in the x-direction and another for the shrinkage of the substrate in the y-direction.

8. The method according to claim 1, which further comprises using the computer to subdivide the digitally available image to be produced into a minimum of four individual quadrants and to successively carry out a process of compensating for the shrinkage of the substrate for every one of the individual quadrants.

9. The method according to claim 1, which further comprises forming the digitally available image to be produced of halftone data and screening the digitally available image by using the computer after a process of compensating for the shrinkage of the substrate and before the printing operation.

10. The method according to claim 1, which further comprises adapting a process of compensating for the shrinkage of the substrate to an ink jet printing operation, and carrying out the step of printing the compensated digital image on an ink jet printing machine.

* * * * *